United States Patent [19]

Frederick

[11] Patent Number: 4,466,191
[45] Date of Patent: Aug. 21, 1984

[54] METHOD FOR CREATING A PLAT FROM A METES AND BOUNDS PROPERTY DESCRIPTION

[76] Inventor: James H. Frederick, 509 South 4th St., Crockett, Tex. 75835

[21] Appl. No.: 457,007

[22] Filed: Jan. 10, 1983

[51] Int. Cl.$^3$ ............................................. G01C 15/00
[52] U.S. Cl. .......................................... 33/1 B; 33/1 N
[58] Field of Search ................ 33/1 R, 1 B, 1 G, 1 N, 33/1 MP, 1 SP; 434/88, 90

[56] References Cited

U.S. PATENT DOCUMENTS

| | | | |
|---|---|---|---|
| 647,339 | 4/1900 | Thompson | 33/1 N |
| 1,552,406 | 9/1925 | Akerbladh | 434/88 |
| 2,424,065 | 7/1947 | Stewart | 33/1 N |
| 2,973,579 | 3/1961 | Schuert | 33/1 B |

FOREIGN PATENT DOCUMENTS 520785  3/1955  Italy ...................................... 33/1 N

*Primary Examiner*—Richard R. Stearns
*Attorney, Agent, or Firm*—Thomas L. Cantrell; Warren B. Kice; Stanley R. Moore

[57] ABSTRACT

A method for drawing a plat from a metes and bounds property description includes the steps of providing a first page presenting a compass rose and a grid pattern. A plurality of lines are then created on the first page, each beginning at a center point on the compass rose and extending in a direction of a respective call of the metes and bounds measurements. Each of the plurality of lines are then numbered to correspond to the order of the respective calls. A second page is also provided having a grid pattern thereon which is aligned with the grid pattern of the first page. A first line corresponding to a first call of the metes and bounds description is then traced from the first page onto the second page, and the line is scaled an amount corresponding to a magnitude of the first call. The second page is then moved to a location at which the end of the scaled line overlies the center point of the compass rose, and the tracing and scaling steps are repeated, while continuing to maintain the first and second pages in registration, for each of the remaining calls to generate the plat of the property.

10 Claims, 5 Drawing Figures

METHOD FOR CREATING A PLAT FROM A METES AND BOUNDS PROPERTY DESCRIPTION

BRIEF DESCRIPTION OF THE INVENTION

1. Field of the Invention

This invention relates to improvements in mapping methods, and, more particularly, to improvements in methods for producing plat drawings from metes and bounds property descriptions.

2. Description of the Prior Art

Often in deeds and other instruments which describe real property of real estate, the property is described in terms of metes and bounds, especially in descriptions of unsubdivided land and irregularly shaped land tracts. For example, one metes and bounds property description may be as follows:

"beginning on a 36" P. 0. being the southeast corner of this tract,
thence S 57°13'56" W, 696.98 feet;
thence N 53°25' W, 215.5 feet, and 45°21' W, 274.0 feet;
thence N 56°32' E, 828.0 feet;
thence S 33°20' E, 479.2 feet to the place of beginning.

In the past, to generate a plat from such description, typically one would begin at a point on a page and determine with a protractor an angle of 57° 13' and 56" from south in a westerly direction. A line would then be drawn between the beginning point along the radial and a point representing a scaled 696.98 feet. Then, the protractor would be moved to bring its origin to the end of the first line, and a second radial determined from that point along a radial 53° 25' measured from north in a westerly direction, and a line drawn from the end of the first line along the second radial a scaled distance of 215.5 feet. The process would continue in similar fashion until all the calls have been drawn. A call is referred to herein as being one of the bearing and distance specifications of the metes and bounds description.

One of the principal disadvantages of the method described is that any slight error in drawing one of the calls will become multiplies and carried forward with each subsequent call. Also, each time the origin of the protractor is moved to the new beginning of the call next to be drawn, it is difficult to align with a north-/south direction to insure continued accuracy in completing the drawing.

In efforts to increase the accuracy of plats drawn from metes and bounds descriptions, various mechanical and computer assisted aids have been proposed, which are expensive and/or complicated to employ in such map or plat creation.

SUMMARY OF THE INVENTION

In light of the above, it is, therefore, an object of the invention to provide a method for drawing maps or plats from metes and bounds property descriptions.

It is another object of the invention to provide a method for drawing maps or plats from metes and bounds property descriptions which does not require complicated mechanical, computing, or expensive drafting equipment.

It is another object of the invention to provide a method for drawing maps or plats from metes and bounds property descriptions of the type described which is simply or easily accomplished and which reduces the likelihood of error multiplication during the creation of the map or plat.

It is another object of the invention to provide a method for drawing a map or plat from a metes and bounds property description which is easier to use and/or teach than most conventional hand-drafting methods involving the use of a protractor.

It is still another object of the invention to provide a method for drawing a map or plat from a metes and bounds property description of the type described which is more efficient than most conventional hand-drafting methods.

These and other objects, features and advantages will become apparent to those skilled in the art from the following detailed description when read in conjunction with the accompanied drawing and appended claims.

In accordance with a broad aspect of the invention, a method is presented for drawing a plat from metes and bounds measurements of a property description, and includes providing first and second pages having a compass rose with grid lines and a grid pattern respectively printed thereon. A plurality of lines are created on the first page, each beginning at a center point on the compass rose and extending in a direction of a respective one of the metes and bounds measurements. Each of the lines are then traced, in order, on the second page for at least the scaled length corresponding to a distance of the respective one of the metes and bounds measurements, each beginning at the scaled end of the immediately preceding line. During the process, the first and second pages are maintained in alignment by maintaining the alignment of the respective grid patterns thereof. When each of the lines has been traced from the first to the second page, a plat or map of the metes and bounds measurement is produced.

BRIEF DESCRIPTION OF THE DRAWING

The invention is illustrated in the accompanying drawing in which.

DETAILED DESCRIPTION OF THE PREFERRED EMBODIMENTS

Figure 1:
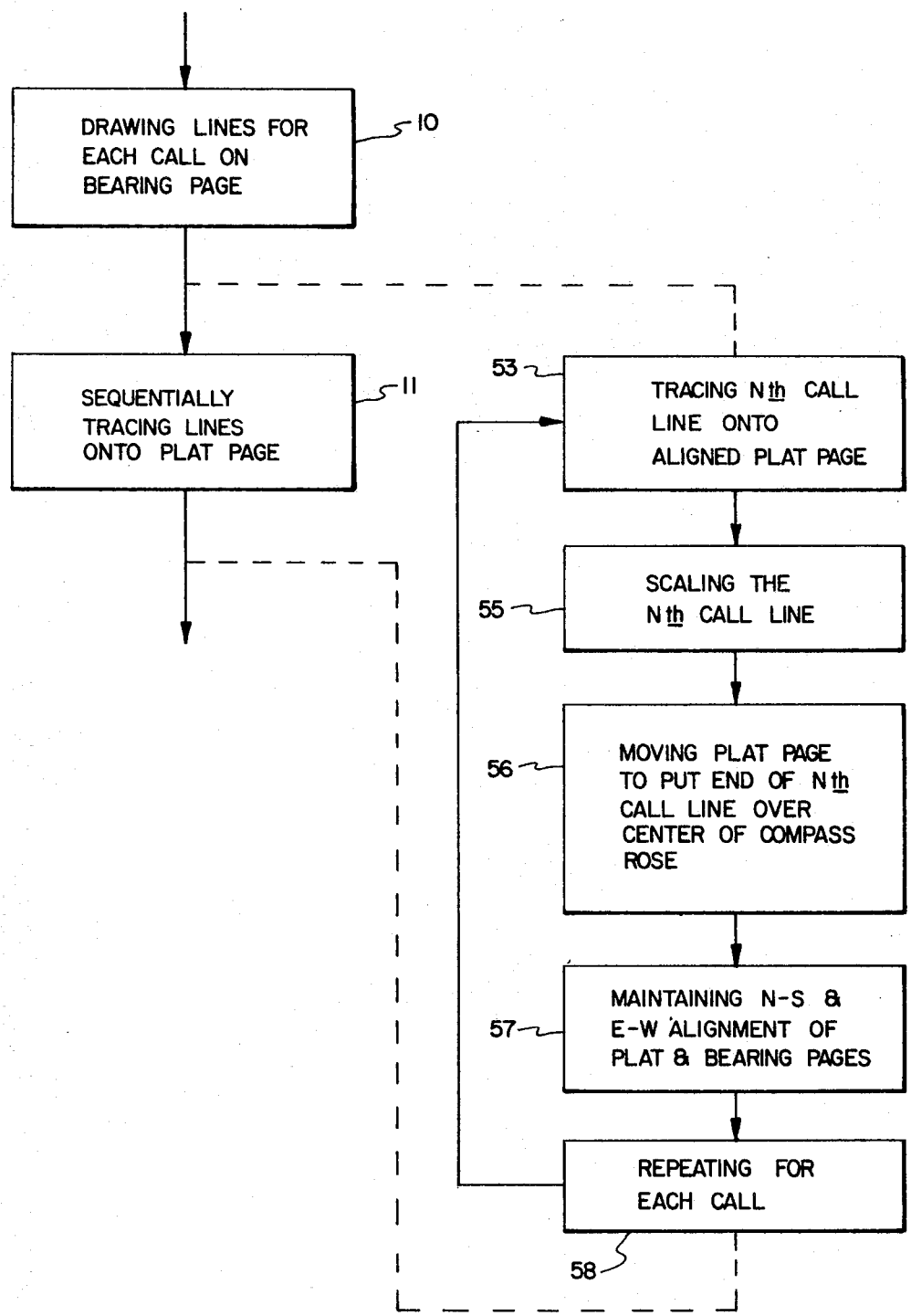
FIG. 1 is a flow chart showing the steps for producing a plat from a metes and bounds property description in accordance with the invention.

The steps of the method of the invention are illustrated in the the block diagram of FIG. 1. In its broad aspect, the method of the invention for producing a plat or map from a metes and bounds property description includes the steps of drawing lines for each call of the metes and bounds description onto a first or bearing page containing a compass rose, box 10. Subsequently, the lines are sequentially traced onto a second, or plat page, box 11, to produce the map or plat desired.

Figure 2:
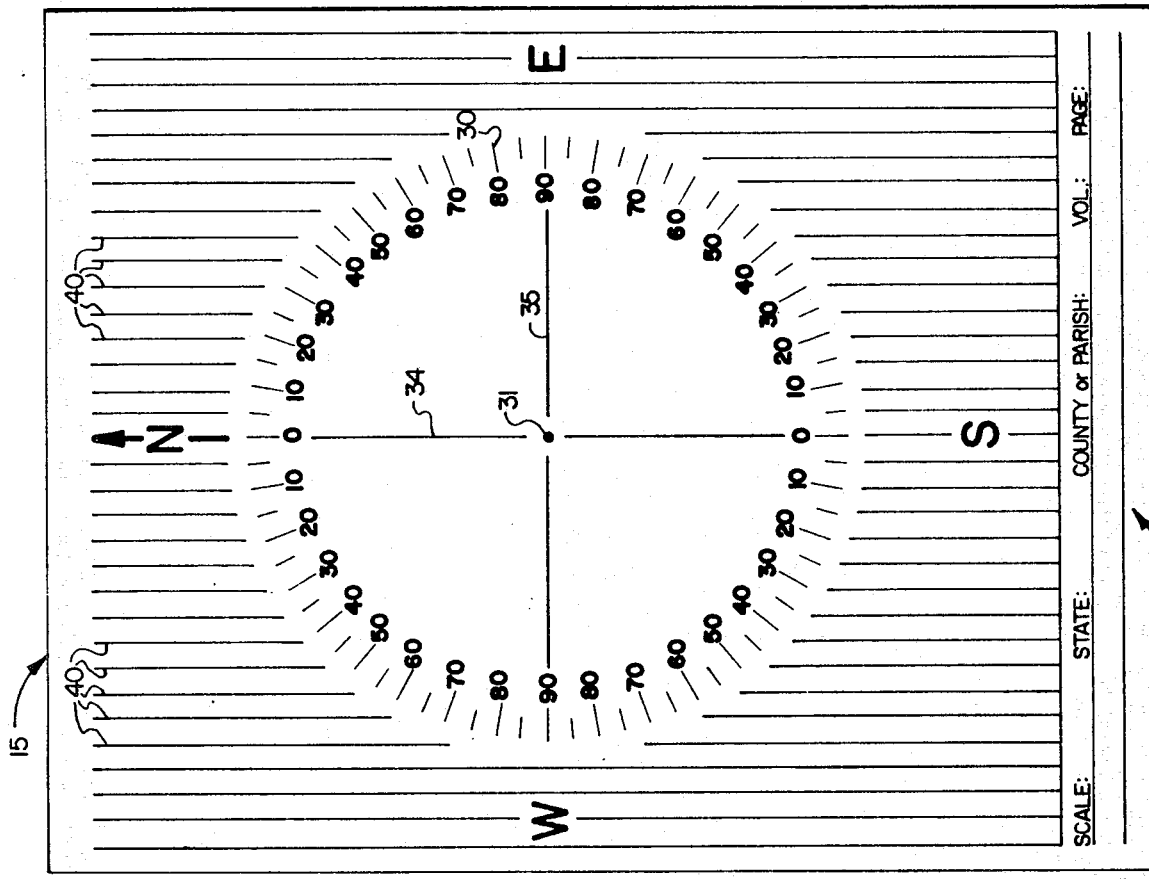
FIG. 2 is a copy of a first or bearing page for use in accomplishing the method illustrated by the flow chart of FIG. 1.

More particularly, in accomplishing the method in accordance with a preferred embodiment of the invention, a first or bearing page 15 is employed having the form shown in FIG. 2. The bearing page 15 includes a compass rose 30 aligned with its north and south (N-S) coordinates along the length of the page, and with its east and west (E-W) coordinates aligned with the width of the page, as shown. The compass rose 30 is numbered in each quadrant from 0° to 90°, the 0° angles corresponding to north and south directions and the 90° angles corresponding to east and west directions to facilitate the standard practice of specifying directions from a north or south direction followed by specific angles in an easterly or westerly direction. Additionally, the compass rose 30 is provided with a dot 31 representing its origin or center, as well as crossed lines 34 and 35 extending respectively in N-S and E-W directions. On the bearing page 15, outside of the compass rose 30, are contained a number of parallel grid lines 40 which may extend in a N-S direction, as shown. If desired, horizontal lines may be included extending along E-W directions (not shown) to further assist in maintaining the required alignment between the bearing page of FIG. 2 and the plat or map page of FIG. 3, below described.

Figure 3:
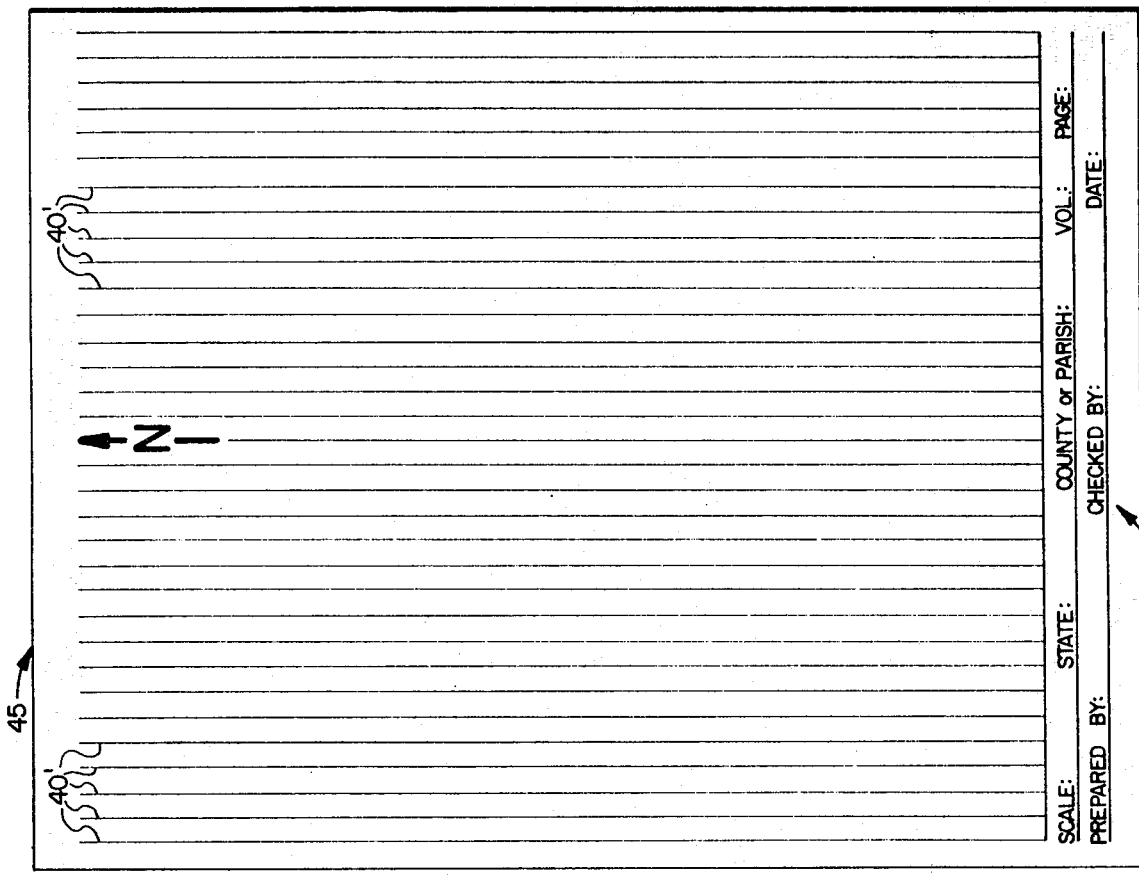
FIG. 3 is a copy of a second or plat page for use in accomplishing the method in accordance with the flow chart of FIG. 1.

A plat or map page 45 for use in practicing the method in accordance with the invention is shown in FIG. 3. It should be understood that in practice, the grid pattern as shown in FIG. 3 would desirably be printed on a type of paper or material which would facilitate tracing from the underlying bearing page 15, in the fashion below described; thus, it is envisioned that the pattern of the plat page 45 shown in FIG. 3 would be reproduced onto velum, plastic film, tracing paper, or the like.

The pattern shown in FIG. 3 includes a number of parallel lines 40' which are oriented in a N-S direction in a similar fashion to the lines 40 contained on the bearing page 15 of FIG. 2. Again, if desired, horizontal or E-W oriented lines (not shown) may be included in the form of the plat page 45 depicted in FIG. 3 to aid or assist the user in maintaining the alignment between the plat page 45 of FIG. 3 and the bearing page 15 of FIG. 2. It will be apparent that the lines 40' on the map or plat page 45 of FIG. 3 may be of reduced density, of fine line thickness, or of a light non-contrasting color to enable the alignment between the map or plat page 45 of FIG. 3 with the bearing page 15 of FIG. 2 without distracting from the drawing to be traced or created on the plat page 45.

It should be noted that although the lines 40 and 40' are described as being aligned in N-S and/or E-W directions, their purpose is to assure proper registration between the bearing and plat pages, and, therefore, the lines can be arranged in any suitable pattern. As will also be apparent by those skilled in the art, a correspondence is required in the patterns of the grid lines 40 and 40' of the respective bearing and plat pages, although the line spacing, density, and so forth of the grid lines need not be the same.

If desired, as shown, the forms may include north, south, east and west legends, or, if desired, the forms may be left legendless to facilitate selection by the user of the compass directions to be used. For instance, in the map or plat page of FIG. 3, a long narrow tract of land to be drawn may be desirably oriented along the long dimension of the page with the N-S axis being parallel to the short size of the page. Also, if desired, page identification legends 42 and 43 can be included on the respective bearing and plat pages 15 and 45, as shown.

Figure 4:
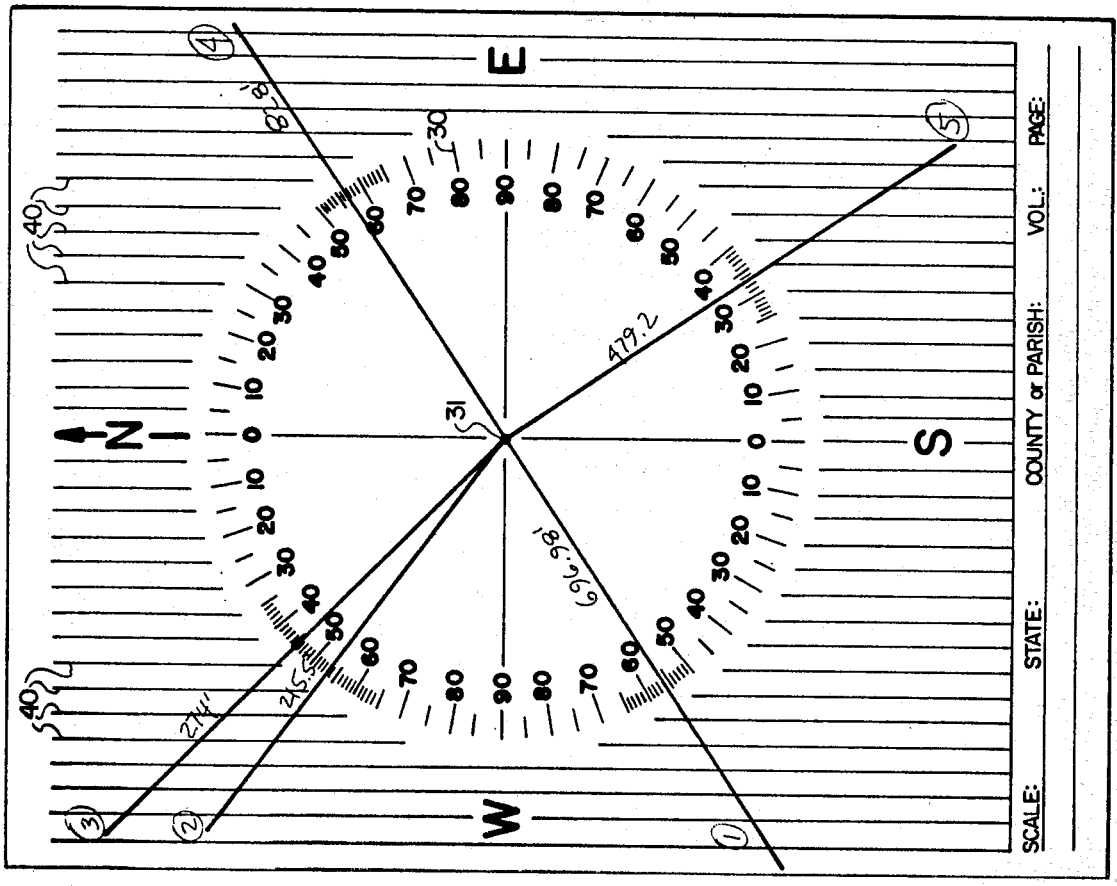
FIG. 4 is a copy of the bearing page of FIG. 2 with a series of calls of a particular metes and bounds property description drawn thereon in accomplishing the method of the invention as illustrated in FIG. 1.

In performing the method in accordance with the invention, reference is now made again to FIGS. 4 and 5, which represent, respectively, the bearing and plat pages of FIGS. 2 and 3, and the box diagram of FIG. 1. As mentioned, the first step in performing the method of the invention is to draw lines for each call of the metes and bounds property description on the compass rose, box 10. Thus, as shown in FIG. 4, using the property description set forth herein above, a number of lines 1-5 are drawn onto the compass rose 30, each beginning at the origin 31, and each corresponding to a respective one of the calls. It can, therefore, be seen that line 1 represents the bearing S 57°13'56"W. Line 2 represents the bearing N 53°25'. Line 3 represents the bearing N 45°21'W. Line 4 represents the bearing N 56°32'E. And line 5 represents the bearing S 33°20'E. It should be noted that the term "drawing lines" is intended to define the commonly used method of forming a continuous line from one point to another as well as less conventional methods, such as indicating at least two points to define a line, as by pencilled dots, compass point holes, or the like. After the lines are thus drawn (and preferably numbered or ordered as shown) if desired, the magnitude or the length of the call may be written or associated with each of the respective lines, as shown. Thus, line 1 is marked as being 696.98 feet; line 2 as 215.5 feet; line 3 as 274 feet; line 4 as 828 feet; and line 5 as 479.2 feet. If desired, though not necessarily required, the respective lines 1-5 can be scaled on the bearing page prior to the subsequent tracing steps below described (scaling on bearing page not shown).

Figure 5:
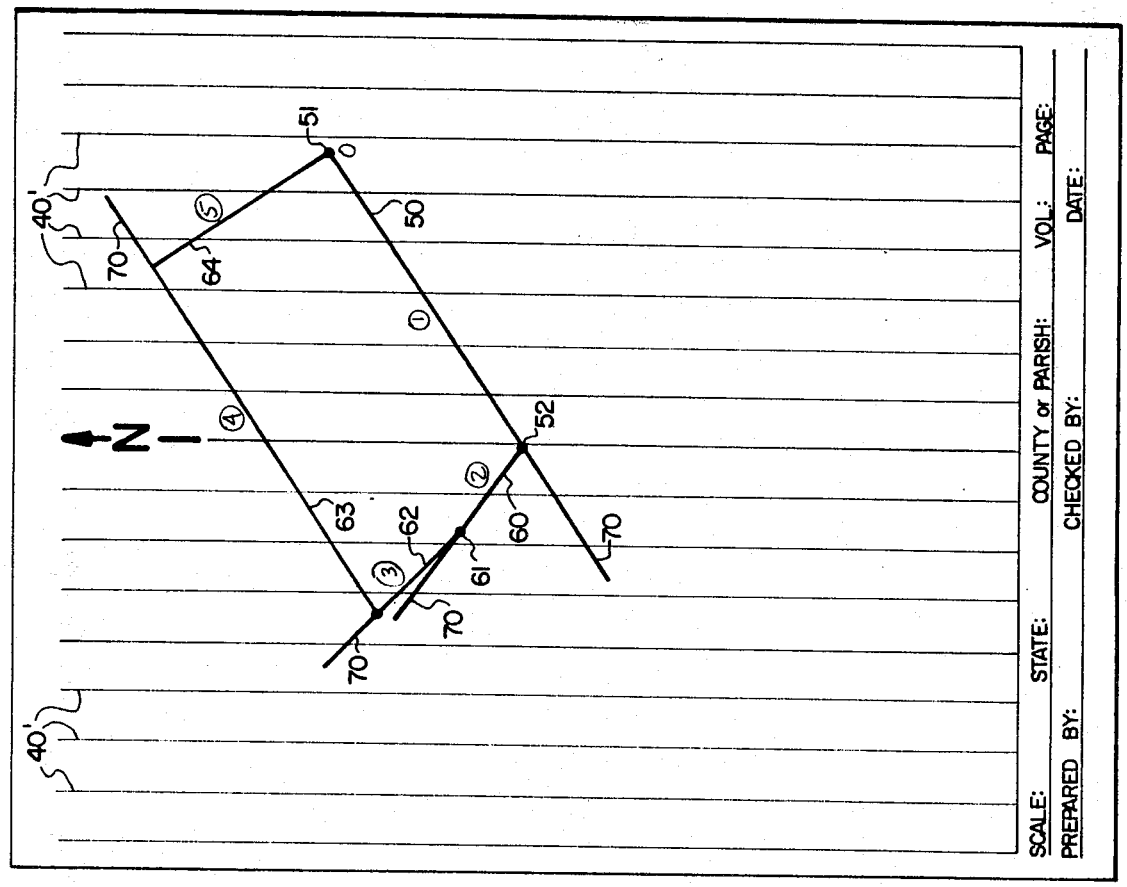
FIG. 5 is a plat generated in accordance with the method of the invention illustrated in FIG. 1.

Thereafter, each of the lines previously drawn on the bearing page of FIG. 4 are sequentially traced onto the plat page, as shown in FIG. 5, the box of the step being denoted generally by the reference numeral 11 in FIG. 1. More specifically, as shown in FIG. 1, a first call line 50 is traced onto the plat page from a beginning point 51, box 53. It should be noted that the plat page shown in FIG. 5 is conveniently maintained in north-south and east-west alignment with the bearing page of FIG. 4 by maintaining the alignment of the lines of the respective grids 40 and 40'. The line 50 is then scaled on the plat page of FIG. 5 to correspond to a scaled distance of 696.98 feet to define an end point 52 of line 50, box 55 (if the line 50 was not scaled on the bearing page of FIG. 4, as discussed above).

The plat page of FIG. 5 is then moved to place the end point 52 of the first call line 50 on the plat page of FIG. 5 over the center point 31 of the compass rose of the bearing page of FIG. 4, box 56 and the line 2 representing the second call of the metes and bounds description is traced and scaled on the plat page of FIG. 5 forming the second plat boundry line 60 having end point 61. During this time, again, the north-south and east-west alignment of the plat page over the compass rose of the bearing page is maintained by maintaining the alignment of the respective grid lines 40 and 40', box 57. The steps are then repeated for each call line, box 58, in similar fashion, to form lines 62, 63 and 64 on the plat page of FIG. 5 from the bearing page of FIG. 4. Thus, after all of the lines 50, 60, 62, 63, and 64 have been formed, if desired, the drawing can be finished by erasing the tails 70 from the page, indicating any center lines, and so forth.

It will be appreciated that the method of the invention can be used to generate a plat of a property description of any number of calls. If, for instance, a single bearing page becomes confusingly full of lines, a second, or third, bearing page can be employed, yet used in conjunction with the same plat page. It should also be noted that the method can be easily used to prepare two or more plats on the same plat page generated from several bearing pages, each representing one of the properties to be prepared.

Although the invention has been described and illustrated with a certain degree of particularity, it is understood that the present disclosure is made by way of example only and that numerous changes in the combination and arrangement of elements, uses and steps may be resorted to by those skilled in the art without departing from the spirit and the scope and the invention as hereinafter claimed.

I claim:

1. A method for drawing a plat from metes and bounds measurements of a property description, comprising:

drawing a plurality of lines on a first page containing a compass rose, each beginning at a center point on said compass rose and extending in a direction of a respective one of said metes and bounds measurements, tracing at least a scaled length of each line corresponding to a distance of said respective one of said metes and bounds measurements, each in turn, end to scaled end, on a second page maintained in alignment with directions of said compass rose to form said plat.

2. The method of claim 1 further comprising scaling said plurality of lines on said first page prior to said tracing step.

3. The method of claim 1 further comprising scaling each of said plurality of lines in turn on said second page prior to tracing a next successive line.

4. The method of claim 1, 2 or 3, further comprising maintaining the alignment of said second page by maintaining a grid on said second page in alignment with N-S and E-W directions indicated by said compass rose.

5. The method of claim 1 further comprising providing lines on said first and second pages for maintaining the alignment therebetween.

6. The method of claim 5 wherein said line providing step comprises providing a grid pattern on said first and second pages.

7. A method for drawing a plat from metes and bounds measurements of a property description, comprising:

providing a first page having a compass rose and grid lines thereon, creating a plurality of lines on said first page, each beginning at a center point on said compass rose and extending in a direction of a respective one of said metes and bounds measurements, numbering each of said plurality of lines to correspond to the order of said metes and bounds measurements, providing a second page having a grid pattern thereon, tracing in order on said second page at least a scaled length of each line corresponding to a distance of said respective one of said metes and bounds measurements, each beginning at a scaled end of the immediately preceeding line, and concurrently, maintaining the alignment of the first and second pages by maintaining the alignment of the respective grid patterns thereof, whereby when the lines have each been traced, a plat of the metes and bounds measurements is produced.

8. The method of claim 7 further comprising scaling said plurality of lines on said first page prior to said tracing step.

9. The method of claim 7 further comprising scaling each of said plurality of lines in turn on said second page prior to tracing a next successive line.

10. A method for drawing a plat from calls of a metes and bounds property description, comprising:

(a) providing a bearing page having a compass rose and a grid pattern thereon, (b) creating a plurality of lines on said bearing page, each beginning at a center point on said compass rose and extending in a direction of a respective call of said metes and bounds measurements, (c) numbering each of said plurality of lines to correspond to the order of said respective calls, (d) providing a plat page having a grid pattern thereon, (e) aligning said grid pattern of said plat page with said grid pattern of said bearing page, (f) tracing a first line corresponding to a first call of said metes and bounds description from said bearing page onto said plat page, (g) scaling said first line an amount corresponding to a magnitude of said first call, (h) moving said plat page to a location at which the scaled end of said first line overlies said center point of said compass rose, (i) repeating steps (e) through (h) for each respective call of said metes and bounds description, whereby when the lines have each been traced, a plat of the metes and bounds measurements is produced.

* * * * *